United States Patent [19]

Gavrilovic et al.

[11] Patent Number: 5,166,948
[45] Date of Patent: Nov. 24, 1992

[54] OPTICALLY PUMPED UP CONVERTING LIGHT SOURCE

[75] Inventors: Pavle Gavrilovic, Brockton, Mass.; Shobha Singh, Summit, N.J.

[73] Assignee: Polaroid Corporation, Cambridge, Mass.

[21] Appl. No.: 718,344

[22] Filed: Jun. 19, 1991

[51] Int. Cl.[5] ............................................. H01S 3/091
[52] U.S. Cl. ......................................... 372/70; 372/41
[58] Field of Search ......................... 372/41, 68, 70, 75

[56] References Cited

U.S. PATENT DOCUMENTS 3,833,862 9/1974 Wickersheim et al. ................ 372/68

Primary Examiner—Léon Scott, Jr.
Attorney, Agent, or Firm—Ralph R. Veseli; Edward S. Roman

[57] ABSTRACT

An up converting method and apparatus includes a crystalline structure responsive to light emitted from pump light for producing visible and/or ultraviolet light therefrom which is of a shorter wavelength than the pump light. This crystalline structure comprises a composition containing active ions of trivalent rare earth elements and a host material of either anhydrous rare earth halides or rare earth oxysulfides. This crystalline structure is represented by the atomic formula $M_{(1-x)}R_xZ_3$ or $M_{2(1-x)}R_{2x}O_2S$ where M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, x is a value in the range from 0.005 to 1.0, and Z is a halogen selected from the group comprising chlorine, bromine, and iodine. When optically pumped, the crystalline structure produces visible and/or ultraviolet light by either a direct or indirect two step up conversion process. An electronic printing apparatus can also use the up converting crystalline structures to expose photosensitive media in the manner of this invention.

34 Claims, 8 Drawing Sheets $\lambda_1$ = INFRARED LIGHT $\lambda_2$ = VISIBLE AND/OR ULTRAVIOLET LIGHT

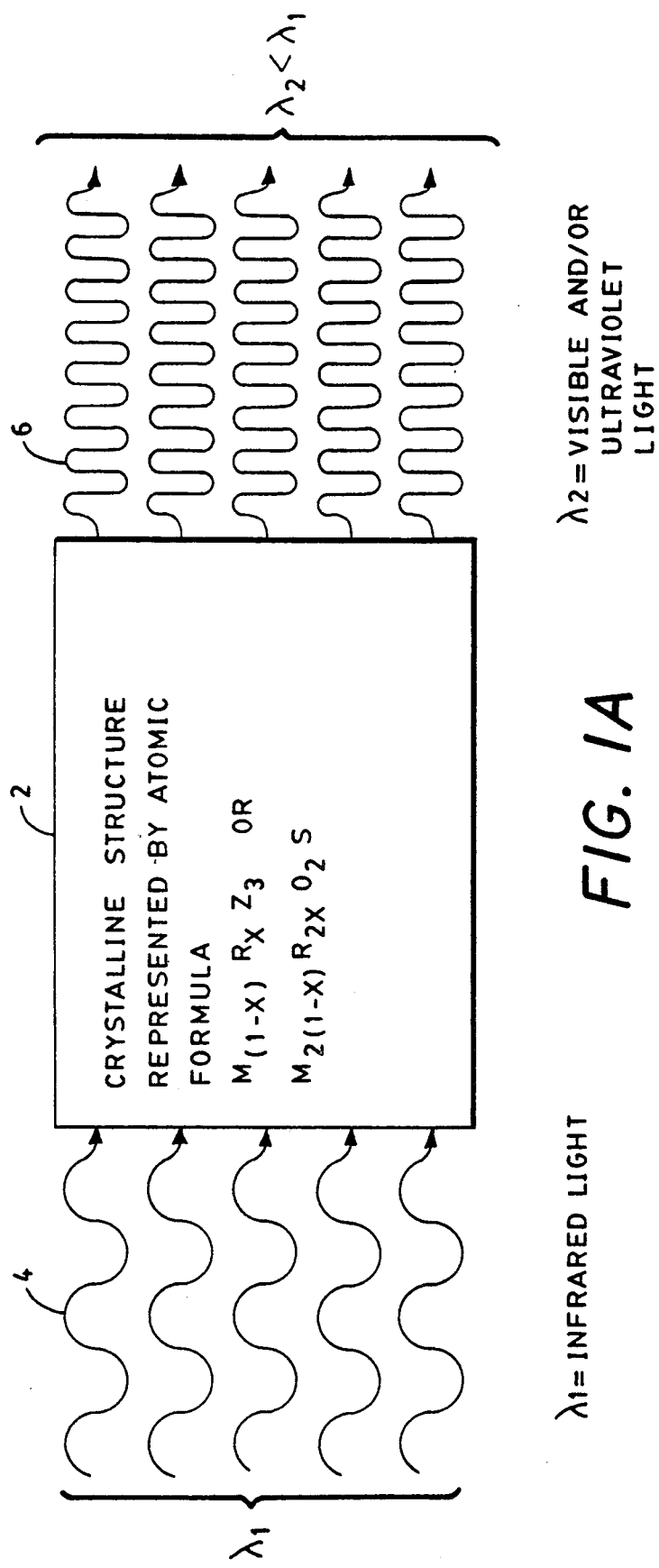

ic structure.

OPTICALLY PUMPED UP CONVERTING LIGHT SOURCE

FIELD OF THE INVENTION

This invention relates to an up converting method and apparatus in which a light source receives pump light and produces therefrom visible and/or ultraviolet light that has a shorter wavelength than that of the pump light. More particularly, this invention relates to a crystalline structure that comprises a composition containing an active ion of trivalent rare earth elements and a host material of either anhydrous rare earth halides or rare earth oxysulfides which receives the pump light and produces the visible and/or ultraviolet light therefrom.

BACKGROUND OF THE INVENTION

Presently, research continues on developing a simple, reliable, and cost-effective method and apparatus to produce and control the distinct red-green-blue point light sources necessary to electronically expose recorded images onto a conventional silver halide film. One approach that holds particular merit employs the physical phenomenon known as photoluminescence. Photoluminescence is the ability of certain solids, known as phosphors, to emit photons when irradiated by an external light source. Specifically, the use of "up-conversion" phosphors in conjunction with semiconductor laser diodes, typically GaAs diodes, hold the best promise for producing the necessary red-green-blue light for exposing silver halide film. Conceptually, "up-conversion" phosphors operate quite simply. A semiconductor laser diode can be used to irradiate infrared light onto the "up conversion" phosphor which, in turn, produces a visible and/or ultraviolet light therefrom. Practically, several issues must be resolved before "up conversion" phosphors can become a commercial reality.

Specifically, three problems impede the use of "up conversion" phosphors as the means to electronically expose images onto silver halide film. First, the host material for the "up conversion" phosphor must have low phonon energy, that is, the dopant atoms should not give off their energy to lattice vibrations of the host material when irradiated with photons. When the laser diode radiates photons onto the phosphor, the phosphor must use the photon energy to start the "up conversion" process, rather than to uselessly pump the energy into the lattice. Second, dopant atoms for the phosphor must have optically absorbing energy bands which correspond directly and integrally with the wave number associated with the light generated by the semiconductor laser diodes. This is so that the dopant atoms can absorb the radiated light from the semiconductor diode, rise to higher optically absorbing energy bands, and subsequently relax in energy and emit visible and/or ultraviolet light. In short, so that the phosphor can operate as an "up conversion" phosphor. Finally, the number of steps used by the "up conversion" phosphor must be carefully chosen so that the semiconductor laser diode can provide the necessary photon energy to initiate and continue the resulting "up conversion" process.

SUMMARY OF THE INVENTION

With the foregoing in mind, it is an object of the present invention to provide a crystalline structure which, when irradiated with a pump light, produces visible and/or ultraviolet light having a shorter wavelength than the pump light by either a direct or indirect two step up conversion process.

It is a further object of the present invention to provide a crystalline structure containing active ions of trivalent rare earth elements and a host material of either anhydrous rare earth halides or rare earth oxysulfides which, when irradiated with a pump light, produces visible and/or ultraviolet light having a shorter wavelength than the pump light.

It is yet another object of the present invention to provide a fiber optic faceplate having a plurality of the crystalline structure layers disposed along one face thereof which can produce either a red, green, or blue emission depending on which pump light is being radiated onto the faceplate.

According to this invention, the foregoing objects are achieved by an up conversion process involving one of two crystalline structures which may be integrated into a printer apparatus.

In a first embodiment for the up conversion process, known as the direct two step up conversion process embodiment, a crystalline structure is chosen that has a host material doped with a plurality of dopant atoms wherein each dopant atom has: a ground energy band, a first optically absorbing energy band that has a first energy associated therewith which is expressed as a first wave number, and a second optically absorbing energy band that has a second energy associated therewith which is expressed as a second wave number. It is also of critical importance that the first energy be approximately twice the second energy or, alternatively, that the value of the first wave number be approximately twice the value of the second wave number.

This direct two step up conversion process begins with illuminating incident light in the form of a first plurality of photons having substantially the second wave number onto the crystalline structure. A first portion of the dopant atoms absorb the first plurality of photons so as to raise the first portion of the dopant atoms from the ground energy band to the second optically absorbing energy band. Thereafter, while the first portion of the dopant atoms are at the second energy band, the crystalline structure continues to be illuminated with incident light in the form of a second plurality of photons having substantially the second wave number associated therewith. The first portion of the dopant atoms absorb a first portion of the second plurality of photons so as to raise the first portion of the dopant atoms to the first optically absorbing energy band while a second portion of the dopant atoms absorb a second portion of the second plurality of photons so as to raise the second portion of the dopant atoms from the ground energy band to the second optically absorbing energy band. The first portion of the dopant atoms thereafter relax in energy from the first optically absorbing energy band to the ground band so as to emit visible and/or ultraviolet light in the form of photons having a plurality of wave numbers associated therewith. A select wave number which is included in this plurality of wave numbers is the most intense of all the emitted light, and is also smaller in value than the first wave number. During this same period, the second plurality of dopant atoms remain at the second optically absorbing energy band while the incident light continues to illuminate the crystalline structure. This continued irradiation of additional pluralities of photons onto the crystalline structure continues the cycle of raising portions of the dopant atoms from the ground energy band to the first optically absorbing energy band and then relaxing the dopant atoms at the first optically absorbing energy band so that they continue to emit visible and/or ultra violet light.

In a second embodiment for the up conversion process, known as the indirect two step up conversion process embodiment, a crystalline structure is chosen that has a host material doped with a plurality of dopant atoms wherein each dopant atom has: a ground energy band, a first optically absorbing energy band that has a first energy associated therewith which is expressed as a first wave number, and a second optically absorbing energy band that has a second energy associated therewith which is expressed as a second wave number. It is also of critical importance that the first energy be approximately twice the sum of the second energy and a third energy or, alternatively, that the value of the first wave number be approximately equal to the sum of the second wave number and a third wave number.

This indirect two step up conversion process begins with illuminating incident light in the form of a first plurality of photons having substantially the second wave number onto the crystalline structure. A first portion of the dopant atoms absorb the first plurality of photons so as to raise the first portion of the dopant atoms from the ground energy band to the second optically absorbing energy band. Thereafter, the first portion of the dopant atoms at the second optically absorbing energy band relax and drop to a third optically absorbing energy band. This third optically absorbing energy band has a third wave number associated therewith that has a value less than the second wave number but greater than the ground energy band. While the first portion of the dopant atoms are at the third energy band, the crystalline structure continues to be illuminated with incident light in the form of a second plurality of photons having substantially the second wave number associated therewith. The first portion of the dopant atoms absorb a first portion of the second plurality of photons so as to raise the first portion of the dopant atoms to the first optically absorbing energy band while a second portion of the dopant atoms absorb a second portion of the second plurality of photons so as to raise the second portion of the dopant atoms from the ground energy band to the second optically absorbing energy band. The first portion of the dopant atoms thereafter relax in energy from the first optically absorbing energy band to the ground band so as to emit visible and/or ultraviolet light in the form of photons having a plurality of wave numbers associated therewith. A select wave number which is included in this plurality of wave numbers is the most intense of all the emitted light, and is also smaller in value than the first wave number. During this same period, the second plurality of dopant atoms remain at the second optically absorbing energy band while the incident light continues to illuminate the crystalline structure. This continued irradiation of additional pluralities of photons onto the crystalline structure continues the cycle of raising a portion of the dopant atoms from the ground energy band to the first optically absorbing energy band and then relaxing the dopant atoms at the first optically absorbing energy band so that they can continue to emit visible and/or ultraviolet light.

The two crystalline structures comprise a composition containing, in the first structure, active ions of trivalent rare earth elements and a host material of anhydrous rare earth halides or, in the second structure, active ions of trivalent rare earth elements and a host of rare earth oxysulfides. These crystalline structures are represented by the atomic formula $M_{(1-x)}R_xZ_3$ or $M_{2(1-x)}R_{2x}O_2S$ where $O_2S$ is oxysulfide, M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, x is a value in the range from 0.005 to 1.0, and Z is a halogen selected from the group comprising chlorine, bromine, and iodine.

The printer apparatus may include either of two embodiments to selectively expose a plurality of longitudinally spaced areas across the face of a photosensitive medium, typically a conventional silver halide film. Since both embodiments of the printer apparatus are substantially similar except for the chemical composition of the crystalline structures disposed on a surface of a fiber optic faceplate, both apparatus shall be discussed together below. Each embodiment of the printer apparatus has an elongated coherent fiber optic faceplate substrate having a substantially planar light receiving surface oppositely spaced apart with respect to a substantially planar light emitting surface. A plurality of light emitting sources are disposed adjacent to the planar light emitting surface so that a light emitting surface of each light emitting source is fixedly stationed in effective light transmitting relationship with the light receiving surface of the fiber optic faceplate. A plurality of uniform layers of a crystalline structures are disposed on the light receiving surface of the fiber optic faceplate. In the first embodiment, the crystalline structure layers comprise active ions of trivalent rare earth elements and a host material of anhydrous rare earth halides while, in the second embodiment, the crystalline structure layers comprise active ions of trivalent rare earth elements and a host material of rare earth oxysulfides. The plurality of crystalline structure layers are disposed on the light receiving surface of the fiber optic faceplate so as to receive light of a first wave length from the light emitting sources and to produce therefrom visible and/or ultraviolet light of a second wavelength which is shorter than the first wavelength. The light emitting surface of the fiber optic faceplate is stationed to accommodate the placement of the photosensitive medium in sufficiently close proximity thereto so that the photosensitive medium can receive the visible and/or ultraviolet light from the plurality of crystalline structure layers.

The up conversion process, crystalline structures, and printer apparatus discussed above also share several common novel characteristics. First, a plurality of light emitting semiconductor diodes which have means for forward biasing operate as the light emitting or pump sources which irradiate incident light onto the crystalline structure. These light emitting semiconductor diodes emit light in an 11000 to 14000 inverse centimeter range so that the optically pumped up converting light source will produce visible and/or ultraviolet light in a 13000 to 26000 inverse centimeter range. Second, the square of the intensity of the light that these light emitting semiconductor diodes radiate onto the crystalline structure determines the intensity of the visible and/or ultraviolet light emitted from the crystalline structure.

DESCRIPTION OF THE DRAWINGS

The novel features that are considered characteristic of the invention are set forth with particularity in the appended claims. The invention itself, however, both as to its organization and its method of operation together with other objects and advantages thereof will be best understood from the following description of the illustrated embodiment when read in connection with the accompanying drawings wherein:

FIG. 1A is a block diagram of a crystalline structure according to this invention;

DESCRIPTION OF THE PREFERRED EMBODIMENTS

FIG. 1A shows generally how the "up conversion" phosphor operates. A crystalline structure 2 represented by the atomic formula $M_{(1-x)}R_xZ_3$ or $M_{2(1-x)}R_{2x}O_2S$ is irradiated by a first plurality of light waves 4 and produces therefrom a second plurality of light waves 6. The first plurality of light waves 4 has a first wave length $\lambda_1$ associated therewith which is longer than a second wave length $\lambda_2$ associated with the second plurality of light waves 6. The first plurality of light waves 4 are also in the infrared wavelength region, typically in the 11000 to 14000 $cm^{-1}$ range, while the second plurality of light waves 6 are in the visible and/or ultraviolet wavelength region.

Figure 1B:
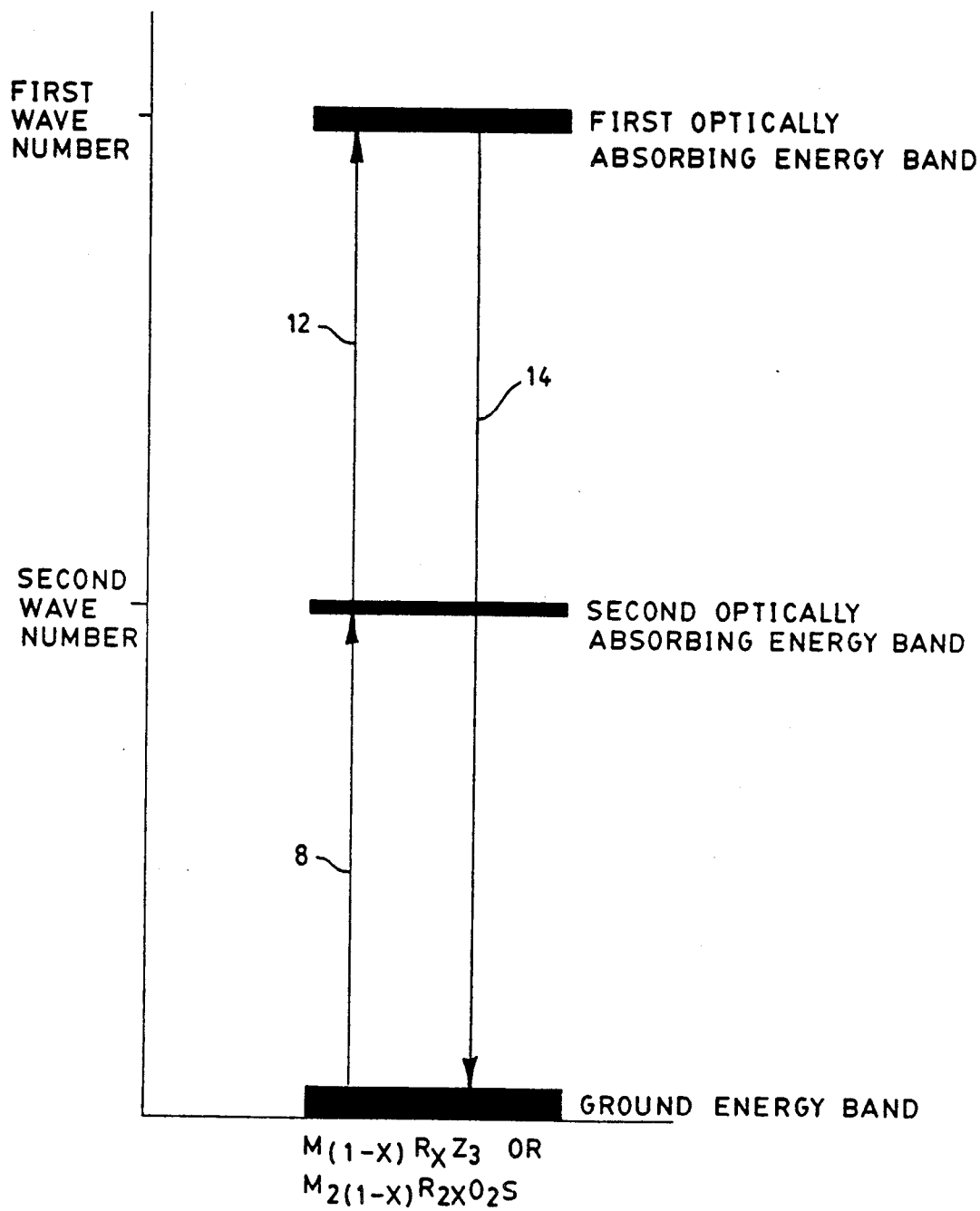
FIG. 1B is an energy level diagram for a crystalline structure according to this invention which illustrates the direct two step up conversion process.
Figure 1C:
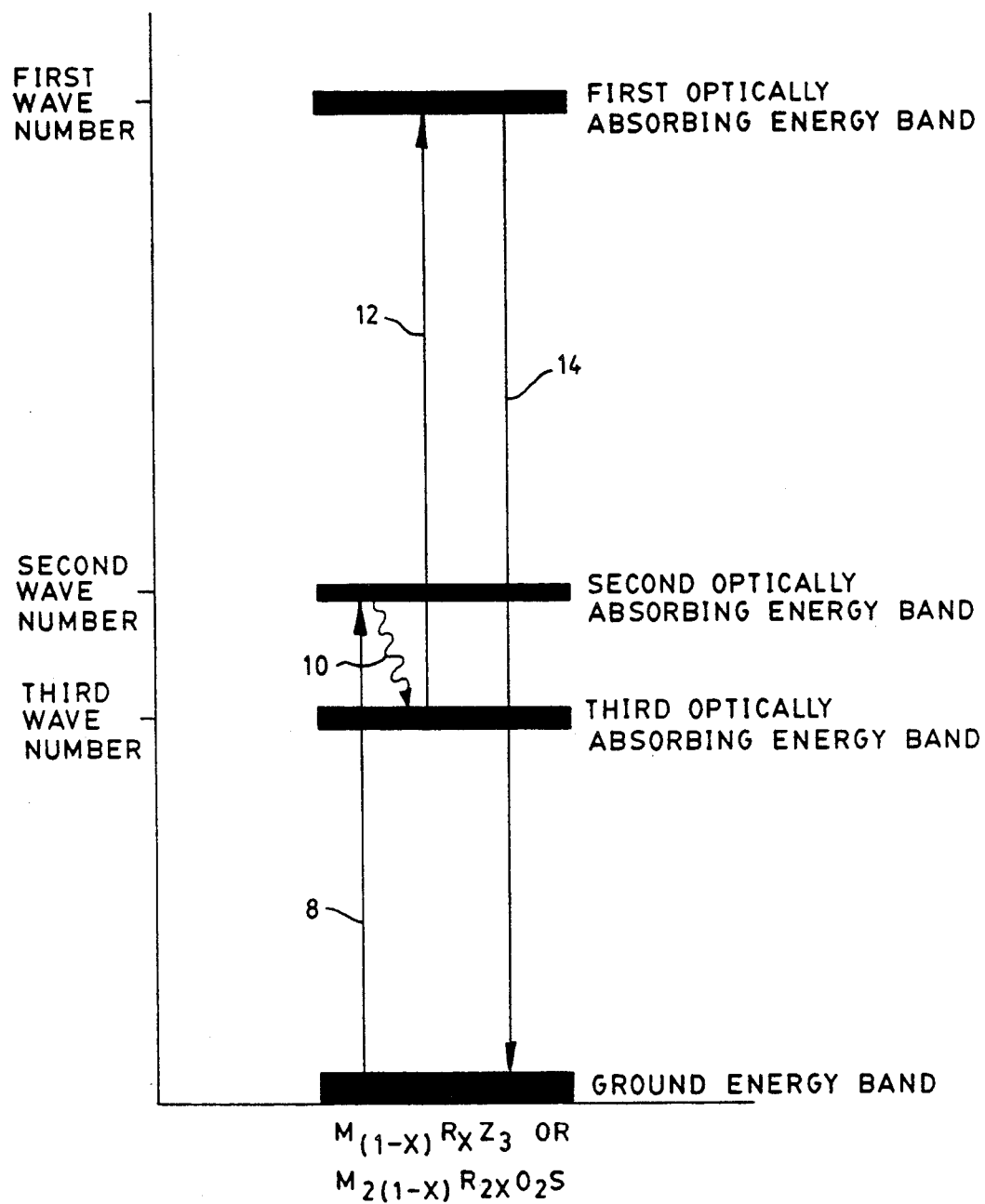
FIG. 1C is an energy level diagram for a crystalline structure according to this invention which illustrates the indirect two step up conversion process.

More specifically, a semiconductor laser diode (not shown), typically a GaAs laser diode, continuously radiates the crystalline structure 2 with infrared radiation that has a wave number which corresponds with a mean energy of an intermediate second optically aborbing energy band of the dopant atoms. Referring to FIGS. 1B and 1C, where like numerals designate similar elements, a first portion of the dopant atoms at the ground energy band absorbs a first portion of the photons associated with the infrared radiation and rises (up transition 8) to the intermediate second optically absorbing energy band. This process of the dopant atoms absorbing photons of the infrared light and rising from one energy band to another energy band being hereinafter referred to as "diode excitation". At this intermediate second optically absorbing energy band, the first portion of the dopant atoms may either (a) partially relax (transition 10) in energy to a lower intermediate third optically absorbing energy band, and then absorb a second succeeding portion of photons from the laser to rise (up transition 12) to a first optically absorbing energy band higher than the intermediate energy bands or (b), without relaxation, absorb the second succeeding portion of photons from the infrared light to rise (up transition 12) to the higher first optically absorbing energy band. As the first portion of dopant atoms are raised to the higher first optically absorbing energy band, a second portion of the dopant atoms absorbs another portion of the photons from the infrared light and rises from the ground energy band to the recently vacated higher intermediate second optically absorbing energy band. The first portion of the dopant atoms then relaxes in energy (down transition 14) to the ground energy band so as to emit photons in the form of visible and/or ultraviolet light. Thereafter, the continued irradiation of the crystalline structure by the diode will continue this cycle of raising dopant atoms from the ground energy band to the first optically absorbing energy band so that the dopant atoms can thereafter relax, drop back to the ground energy band, and emit photons in the form of visible and/or ultraviolet light.

The process of raising dopant atoms by two succeeding back-to-back diode excitations, as shown in FIG. 1B, is known typically as a direct two step up conversion process whereas the process of raising dopant atoms by diode excitation, relaxation, and then another succeeding diode excitation, as shown in FIG. 1C, is known as an indirect two step up conversion process. This two step up conversion process is preferred over other multiple step up conversion processes because it results in a more optically efficient system. That is, the ratio of the visible and/or ultraviolet light radiated from the crystalline structure 2 (FIG. 1A) to the infrared light radiated onto the crystalline structure 2 (FIG. 1A) is higher for a two step up conversion process than for other multiple step processes. Moreover, this two step up conversion process also results in the frequency of the light radiated from the crystalline structure 2 (FIG. 1A) being substantially twice the frequency of the infrared light irradiated onto the crystalline structure 2 (FIG. 1A). That is, in FIG. 1A, the first wave length $\lambda_1$ will be equal to one half the second wave length $\lambda_2$.

It should also be noted that the notation for the quantum energy bands of the dopant atom in FIGS. 1B and 1C are opposite to the normal spectroscopic notation. That is, in normal spectroscopic notation, the number associated with each quantum energy band should increase as the energy bands move away from the ground energy band (i.e., ground energy band, first energy band, second energy band, and third energy band) whereas, in this application, the number associated with each quantum energy band decreases as the energy bands move away from the ground energy band (i.e., ground energy band, third energy band, second energy band, and first energy band). This notation for the quantum energy bands is used so that, regardless of whether the direct or indirect two step up conversion process is being illustrated, the number associated with a quantum energy band is also associated with certain functional characteristics. That is, the second optically absorbing energy band refers to the energy band to which the dopant atoms at the ground energy band will be raised to after the first diode excitation while the first optically absorbing energy band refers to the energy band (a) to which the dopant atoms will be raised to after the second diode excitation and (b) from which the dopant atoms totally relax in energy and then emit visible and/or ultraviolet light.

The crystalline structure of this invention is a crystalline structure comprising a composition containing active ions of trivalent rare earth elements and a host material of either anhydrous rare earth halides or rare earth oxysulfides. The crystalline structure of this invention is represented by the atomic formula $M_{(1-x)}R_xZ_3$ or $M_{2(1-x)}R_{2x}O_2S$ where M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, x is a value in the range from 0.005 to 1.0, and Z is a halogen selected from the group comprising chlorine, bromine, and iodine.

FIGS. 2A-D show the energy level diagrams of several of the various crystalline structures of this invention that are represented by the atomic formula $M_{(1-x)}R_xZ_3$ or $M_{2(1-x)}R_{2x}O_2S$. Moving horizontally from left to right, each energy level diagram contains (a) an ordinate scale in wavelengths per centimeter, (b) the spectroscopic notation for the quantum energy states of the dopant atom, (c) the energy band associated with each quantum energy state, (d) the shorthand letter designation for each energy band, and (e) the mean energy associated with each energy band. In each energy diagram, a diode excitation is represented by an up arrow ( ↑ ), a non-radiative decay is represented by a wavy down arrow, and a radiative decay is represented by a down arrow ( ↓ ).

The energy level diagrams disclose the various energy transitions of the dopant atoms, but do not indicate the relative intensity of the emissions generated by these energy transitions. For example, all of the potential energy transitions indicated in FIG. 2A for $Nd^{3+}$:LaBr$_3$ have been experimentally verified and produce a very broad spectrum of visible and ultraviolet wavelengths. However, the strongest radiative decay, the radiative decay from the D energy band to the Z energy band, produces the most intense emission out of the entire spectrum, namely, a yellow emission. Furthermore, by optimizing the $Nd^{3+}$ concentration in the LaBr$_3$ mixture, this strong radiative decay, namely, the D to Z radiative decay, is enhanced at the expense of suppressing the weaker radiative decays. Unlike FIG. 2A, FIGS. 2B through 2D only disclose the strong energy transitions which are anticipated to generate the most intense emission from the up conversion process. It is anticipated that the optimal mixtures of $Ho^{3+}$:LaBr$_3$ will yield either a green or a red emission, $Er^{3+}$:LaBr$_3$ will yield a green emission, and $Tm^{3+}$:LaBr$_3$ will yield a blue emission. Finally, although FIGS. 2A-2D only show LaBr$_3$ as the host material, any other anhydrous rare earth halides or rare earth oxysulfides could also act as an effective host material.

Figure 2A:
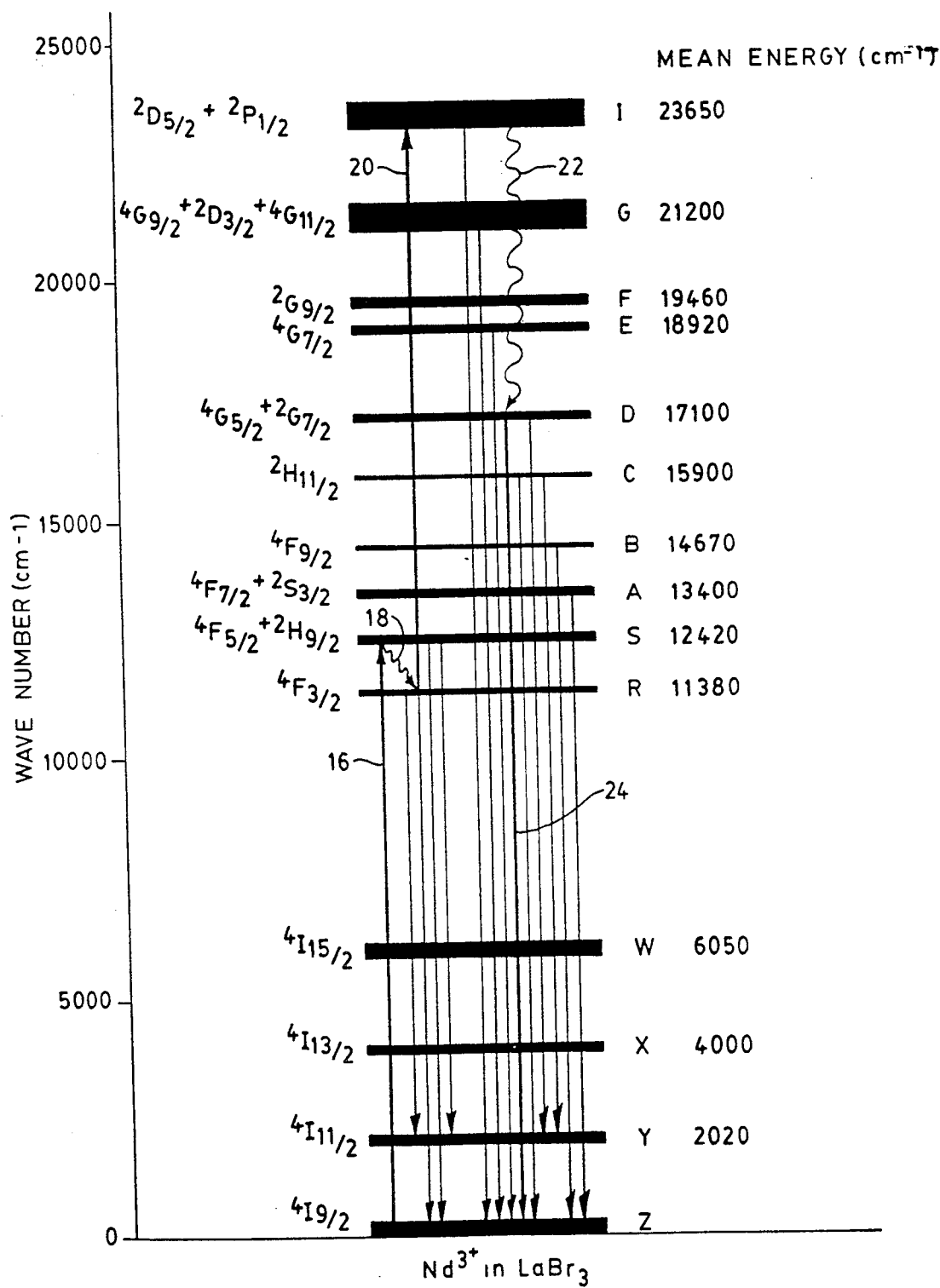
FIG. 2A is an energy level diagram in ordinate units of wave numbers for a $Nd^{3+}$:$LaBr_3$ crystalline structure according to this invention.

Referring now to FIG. 2A, a first transition 16 indicates an excitation and a raising of a portion of the $Nd^{3+}$ atoms from the Z energy band to the S energy band. This is the "diode excitation" discussed above in which the dopant atoms absorb a first portion of photons from the infrared light irradiated onto the crystalline structure 2 (FIG. 1A). In FIG. 2A, this irradiated infrared light has a wave number of approximately 12400 cm$^{-1}$ which corresponds directly with the mean energy associated with the S energy band. As can be seen from FIG. 2A, the S energy band is close in energy to the lower lying R energy band which indicates that $Nd^{3+}$ can efficiently relax from the S energy band to the R energy band with a short lifetime. That is, atoms at the S energy band remain at the S band for a very short period of time before decaying to the next lower lying energy band. In FIG. 2A, the $Nd^{3+}$ atoms remain at the S energy band for a short period of time and then they partially relax in energy (transition 18) to the R energy band. Partial relaxation is the mechanism by which atoms transfer vibrational (heat) energy in the form of phonons to the host crystal lattice. As can be seen from FIG. 2A again, the R energy band has no lower lying energy bands within close proximity which indicates that the R energy band has a relatively long lifetime.

A second transition in the form of a second succeeding diode excitation takes place which again raises the portion of the $Nd^{3+}$ atoms at the R energy band to the I energy band (up transition 20). Note that the mean energy associated with the I energy band is approximately equal to the sum of the mean energy of the R energy band and the wave number associated with the infrared light radiated onto the crystalline structure. Thus, transitions 16, 18, and 20 are illustrative of an indirect two step up conversion process. The $Nd^{3+}$ atoms at the I energy band then partially internally relax in energy (down transition 22) to the D energy band. From the D energy band, the $Nd^{3+}$ atoms then totally relax in energy, (down transition 24) to the Z energy band and emit photons in the form of yellow emissions at 5865 Angstroms.

The above discussion for FIG. 2A has been limited to the indirect two step up conversion process and the strongest radiative decay which yields the most intense emission. However, it should be obvious by reviewing FIG. 2A that many different but weaker radiative decays exist for the $Nd^{3+}$ atoms while they are at the R energy band, the S energy band, or the I energy band. For example, at the R energy band, a portion of the $Nd^{3+}$ atoms drop to the Y and Z energy bands, respectively, and emit infrared light during the drop. These weaker radiative decays are not discussed in detail because, although they broaden the spectrum, they do not add to the intensity of the visible and/or ultraviolet light produced by this up converting process. The weaker radiative decays which do contribute to the intensity of this visible and/or ultraviolet light include: the I to Z radiative decay which produces blue emissions at 4360 Angstroms, the G to Z radiative decay which produces blue emissions at 4774 Angstroms, the E to Z radiative decay which produces green emissions at 5350 Angstroms, the D to Y radiative decay which produces red emissions at 6700 Angstroms, and the B to Z radiative decay which produces red emissions at 6925 Angstroms.

Moreover, in FIG. 2A, the optimized ratio in atomic weight for the $Nd^{3+}$:LaBr$_3$ mixture is between 0.2%-5% $Nd^{3+}$ atoms and 95%-98.8% La atoms. Further increasing of the $Nd^{3+}$ atoms beyond 5% atom fraction while correspondingly decreasing the La concentration below 95% atomic fraction in the $Nd^{3+}$:LaBr$_3$ mixture has no effect in either increasing the intensity of the yellow emissions or decreasing the spectrum of visible and/or ultraviolet light produced. Also, it is understood that the ratio of 0.2%-5% dopant atoms by atomic fraction to 95%–98.8% host anion by atomic fraction discussed above in conjunction with FIG. 2A can also be applied to the mixtures disclosed in FIGS. 2B through 2D.

Figure 2B:
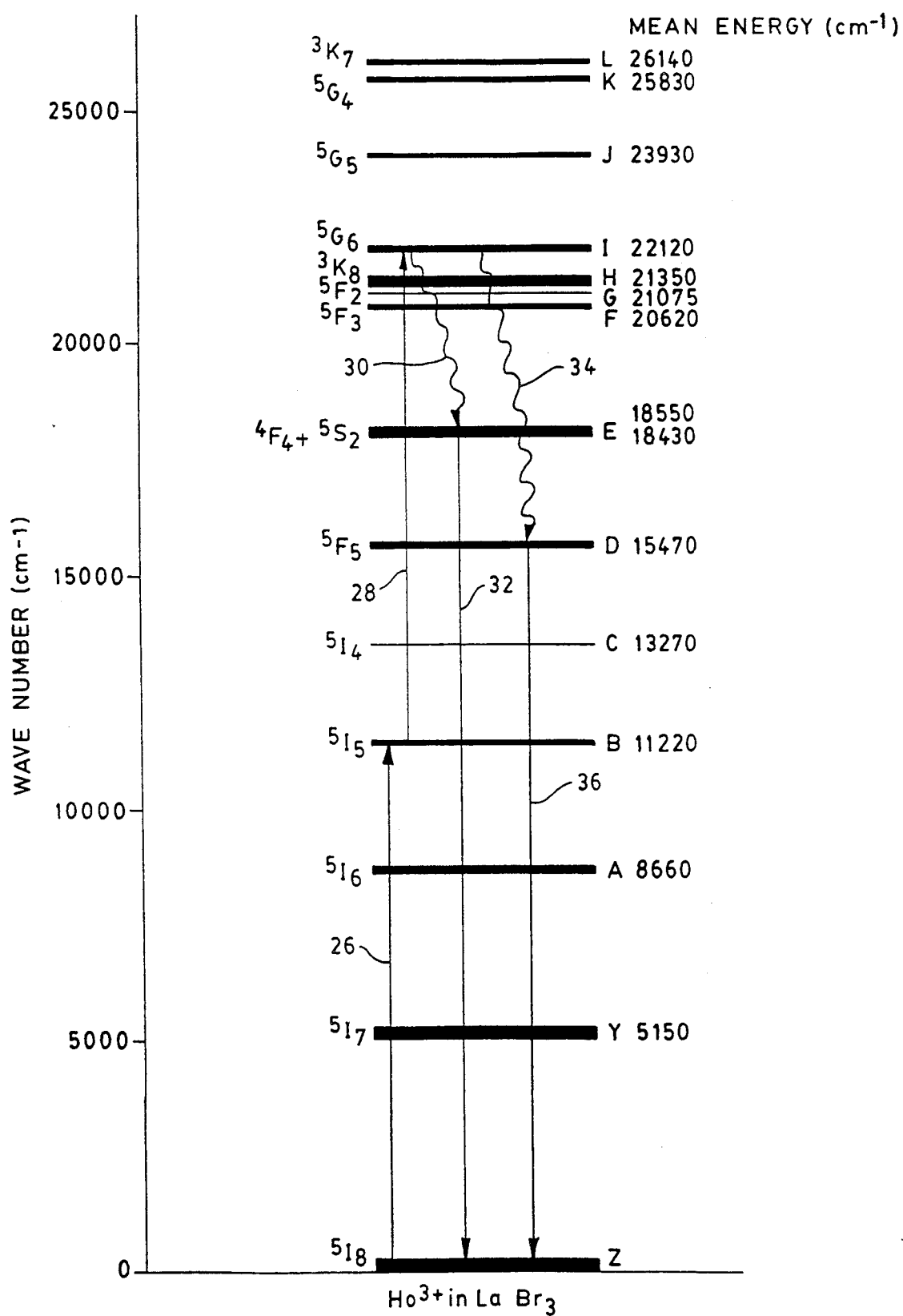
FIG. 2B is an energy level diagram in ordinate units of wave numbers for a $Ho^{3+}$:$LaBr_3$ crystalline structure according to this invention.

FIG. 2B shows the energy level diagram for $Ho^{3+}$:$LaBr_3$, the direct two step up conversion process, and the anticipated pair of strongest radiative decays. A diode excitation (up transition 26) excites and raises a portion of the $Ho^{3+}$ atoms from the Z energy band to the B energy band. In FIG. 2B, the irradiated infrared light has a wave number of approximately 11200 cm$^{-1}$ which corresponds directly with the mean energy associated with the B energy band. As can be seen from FIG. 2B, the B energy band is energetically removed from the lower lying A energy band which indicates that this B energy band has a relatively long lifetime. A second transition in the form of a second diode excitation then takes place which again raises (up transition 28) the $Ho^{3+}$ atoms at the B energy band to one of the energy bands in the F through I region. Note that the mean energy associated with the energy bands in the F through I region are approximately equal to the sum of twice the mean energy of the B energy band. Thus, FIG. 2B is illustrative of a direct two step up conversion process.

The $Ho^{3+}$ atoms in one of the energy bands in the F through I region will then emit either green or red emissions depending on which one among a pair radiative decays occurs. Green emissions are provided by the $Ho^{3+}$ atoms that partially relax in energy (transition 30) to the E energy level and then totally relax in energy (down transition 32) to the Z energy band and emit photons in the form of green emissions. Red emissions are provided by the $Ho^{3+}$ atoms that partially relax in energy (transition 34) to the D energy level and then totally relax in energy (down transition 36) to the Z energy band and emit photons in the form of red emissions.

Figure 2C:
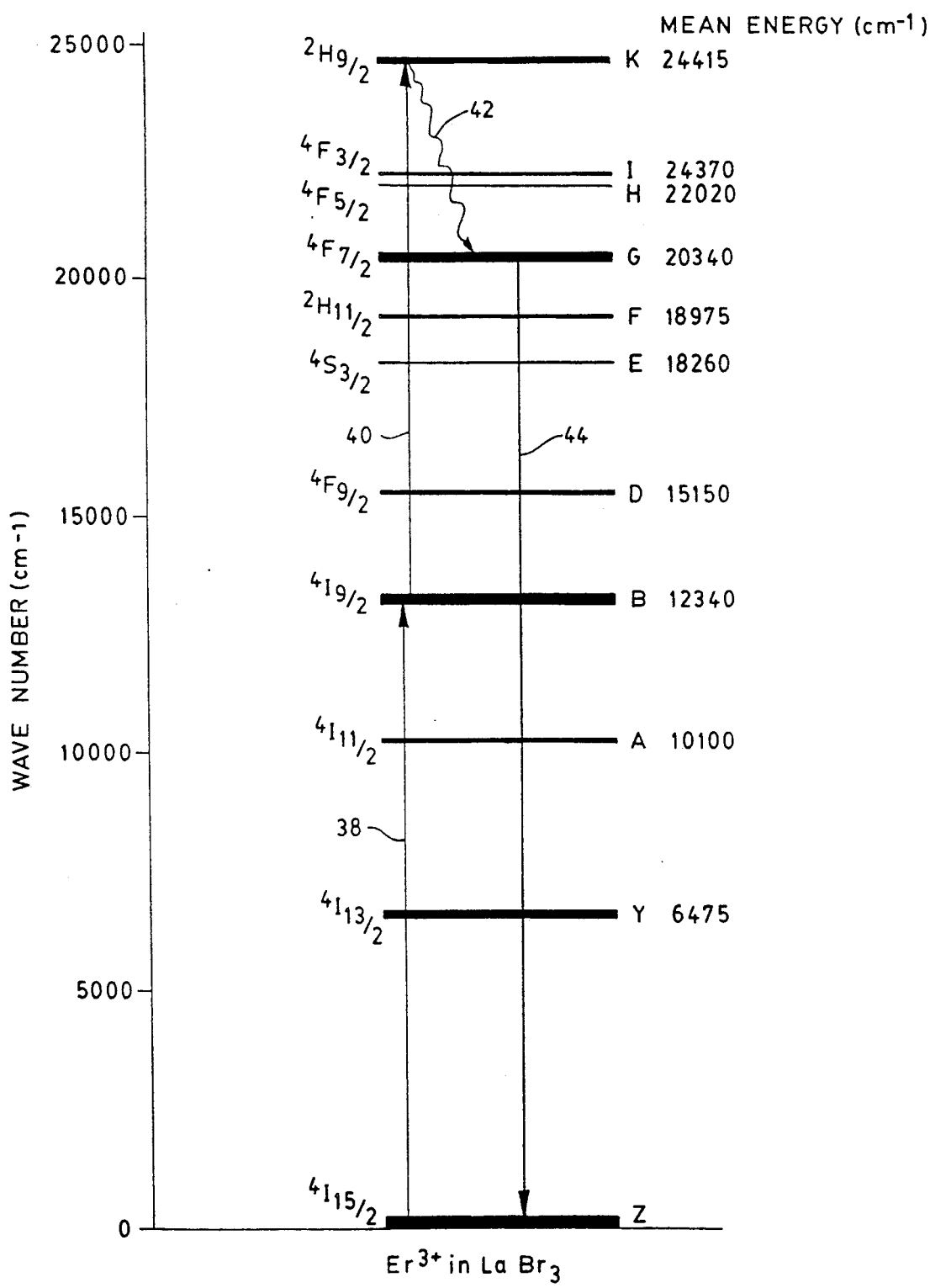
FIG. 2C is an energy level diagram in ordinate units of wave numbers for a $Er^{3+}$:$LaBr_3$ crystalline structure according to this invention.

FIG. 2C shows the energy level diagram for $Er^{3+}$:$LaBr_3$, the direct two step up conversion process, and the anticipated strongest radiative decay. A diode excitation (up transition 38) excites and raises a portion of the $Er^{3+}$ atoms from the Z energy band to the B energy band. In FIG. 2C, the irradiated infrared light has a wave number of approximately 12300 cm$^{-1}$ which corresponds directly with the mean energy associated with the B energy band. As can be seen from FIG. 2C, the B energy band is energetically removed from the lower lying A energy band which indicates that this B energy band has a relatively long lifetime. A second transition in the form of a second diode excitation then takes place which again raises (up transition 40) the $Er^{3+}$ atoms at the B energy band to the K energy band. Note that the mean energy associated with the K energy band is approximately equal to the sum of twice the mean energy of the B energy band. Thus, FIG. 2C is illustrative of a direct two step up conversion process. The $Er^{3+}$ atoms at the K energy band then partially relax in energy (transition 42) to the G energy band. From the G energy band, the $Er^{3+}$ atoms then totally relax in energy (down transition 44) to the Z energy band and emit photons in the form of green emissions.

Figure 2D:
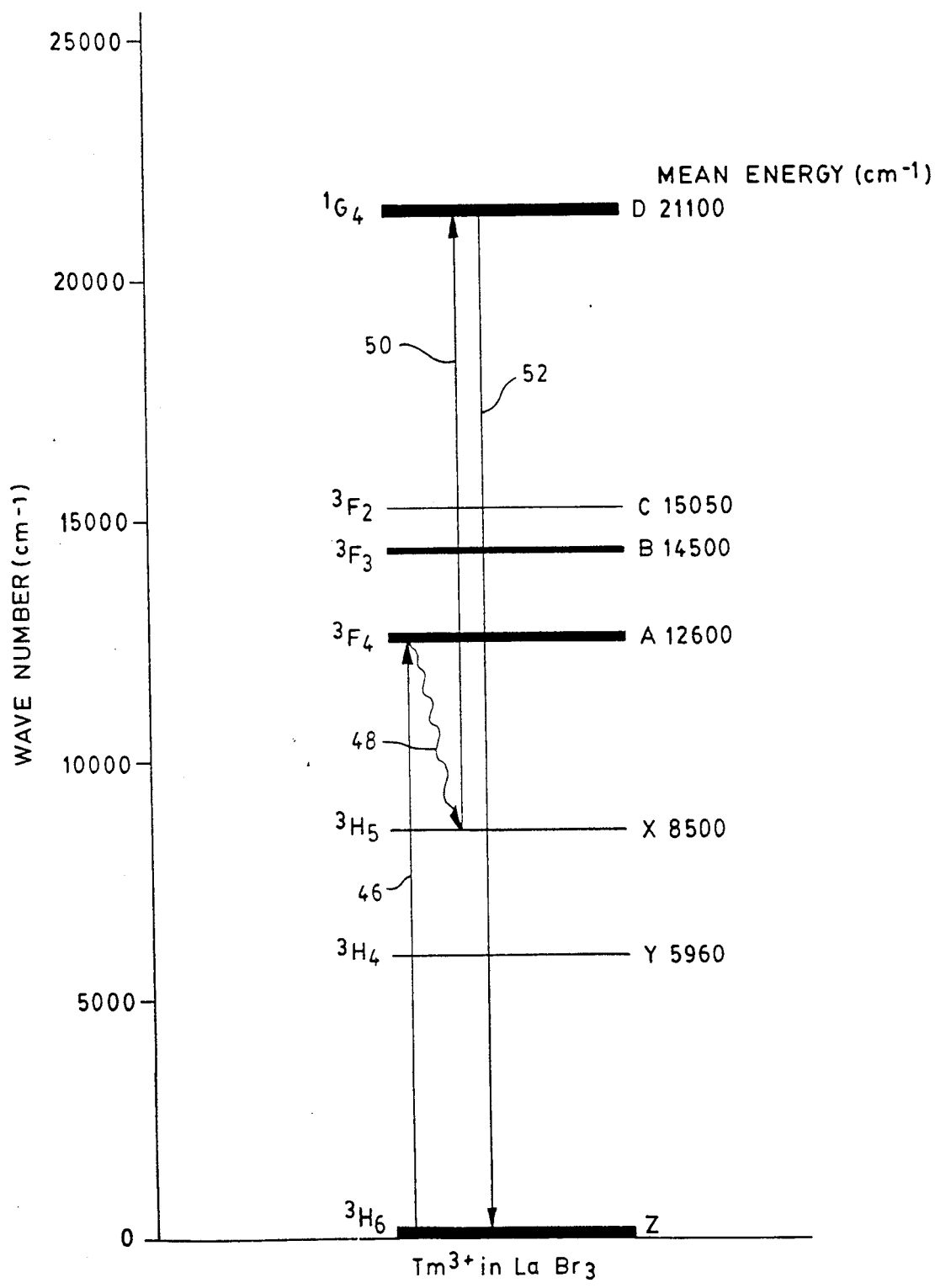
FIG. 2D is an energy level diagram in ordinate units of wave number for a $Tm^{3+}$:$LaBr_3$ crystalline structure according to this invention.

FIG. 2D shows the energy level diagram for $Tm^{3+}$:$LaBr_3$, the indirect two step up conversion process, and the anticipated strongest radiative decay. A diode excitation (up transition 46) excites and raises a portion of the $Tm^{3+}$ atoms from the Z energy band to the A energy band. In FIG. 2D, the irradiated infrared light has a wave number of approximately 12600 cm$^{-1}$ which corresponds directly with the mean energy associated with the A energy band. The $Tm^{3+}$ atoms at the A energy band then partially relax in energy (transition 48) to the X energy band. Next, a second diode excitation takes place which again raises (up transition 50) the $Tm^{3+}$ atoms at the X energy band to the D energy band. Note that the mean energy associated with the D energy band is approximately equal to the sum of the mean energy of the X energy band and the wave number associated with the infrared light irradiated onto the crystalline structure. Thus, FIG. 2D is illustrative of an indirect two step up conversion process. The $Tm^{3+}$ atoms at the D energy band then totally relax in energy (down transition 52) to the Z energy band and emit photons in the form of blue emissions.

Preparation of any of the compositions discussed above may be carried out by a number of preparatory techniques known to all those familiar with crystal growth. A procedure found suitable for preparation of a Nd activated lanthanum tribromide is set forth:

Starting materials are $La_2O_3$ and $Nd_2O_3$, both of a purity of at least 99.99 percent by weight. The oxides are dissolved in HBr solution and the solvent is then evaporated leaving behind the equivalent mixed composition $(La,Nd)Br_2 7H_2O$. This hydrous composition is then heated in vacuum at about 150° C. for a period of about 12 hours, yielding the anhydrous material. This is then melted at a temperature of about 1000° C. in a sublimation flask and the vapor-state material is permitted to sublime in a portion of the flask maintained at a temperature of about 850° C. A bromine carrier gas is used to expedite transfer to the cooler portion of the flask. A single crystal suitable for up conversion use is grown using a Stockbarger technique with growth proceeding within a sealed ampule wherein the crystal is lowered at the rate of about 1 inch per day through a temperature gradient of about 875° to 825° C. with such gradient extending over a distance of about 1 inch.

Alternative procedures for crystal growth are also suitable. Czochralski, zone melting, or any other crystal growth techniques may be used so long as water is excluded from any ambient during any growth. Moreover, subsequent treatment, such as cutting, grinding, and polishing, must also be carried out in a non-hydrous ambient.

The following specific example is illustrative and applicable to any of the mixtures disclosed above. Moreover, it is believed that the general preparatory technique described above is sufficient to enable a worker in the field to reproduce any mixture within the inventive range of this application.

A mixture represented nominally as $Nd^{3+}$:$LaBr_3$ was prepared from the following starting ingredients.

| | |
|---|---|
| $La_2O_3$ | 32.58 grams |
| $Nd_2O_3$ | 0.673 grams |

All the above materials were dissolved in 50% hydrobromic acid until a clear solution was formed. The resulting solution was heated above 500° C. to drive the water off and leave a solid residue behind. The resulting residue was then placed in a quartz test tube connected to a vacuum system and heated at 150° C. for a period of between 10 to 12 hours. The temperature was then ramped up over the period of the next 12 hours to reach a final temperature of 900° C. so that the residue dehydrated and left a melt. From the resulting melt, a single crystal was grown according the Stockbarger technique and cut according to the techniques discussed above.

Figure 3:
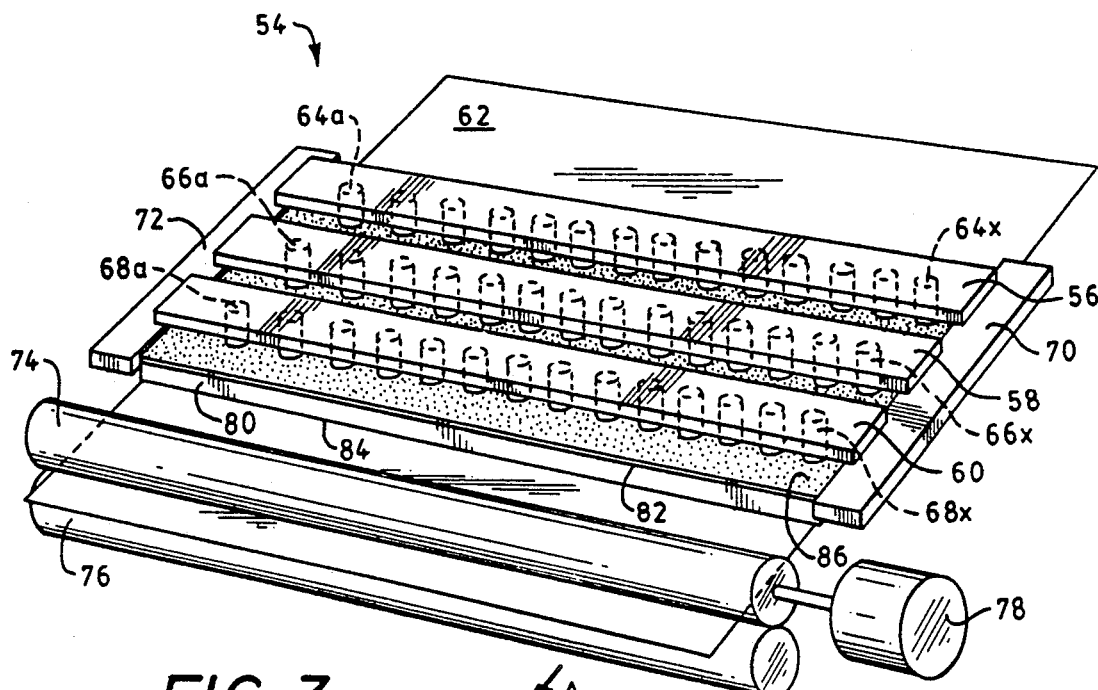
FIG. 3 is a perspective view of an image recording apparatus with a plurality of optically pumped up converting light sources according to this invention.
Figure 4:
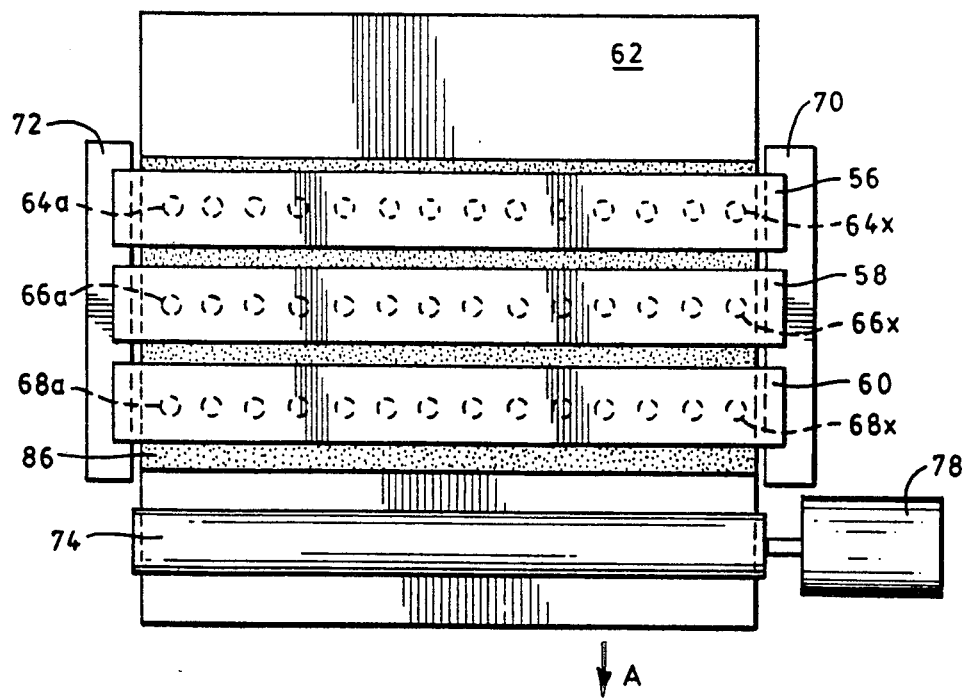
FIG. 4 is a top view of the image recording apparatus of FIG. 3.

Referring now to FIG. 3, there is shown generally at 54 an image recording apparatus using the above described crystalline structure for exposing photosensitive material to an image derived from an electrical signal. The image recording apparatus 54 comprises a series of three line exposing arrays 56, 58, and 60, respectively in light exposing relationship to a photosensitive material 62. Each line array 56, 58, and 60, respectively, comprises a plurality of linearly spaced apart light emitting semiconductor laser diodes 64a-64x, 66a-66x, and 68a-68x, respectively, which radiates one of the three infrared frequencies necessary for the crystalline structures discussed above to radiate therefrom either red, green, or blue emissions. Each plurality of linearly spaced apart light emitting semiconductor laser diodes 64a-64x, 66a-66x, and 68a-68x, respectively, is maintained in its spaced apart relationship with respect to each other by connection to a pair of ceramic substrates 70 and 72, respectively, in a manner as is well known in the art. It should also be mentioned that the size and the placement of each of the semiconductor laser diodes 64a-64x, 66a-66x, and 68a-68x shown in FIGS. 3 and 4 is grossly exaggerated and for illustrative purposes only. For example, it is expected that hundreds of semiconductor laser diodes, typically either GaAs or AlGaAs diodes, will be placed on each line array 56, 58, and 60.

The photosensitive material 62 may be advanced in the direction of the arrow A by a pair of drive rollers 74 and 76 rotatably driven by a motor 78 which is preferably of the stepper motor type. The semiconductor laser diodes 64a-64x, 66a-66x, and 68a-68x, are selectively energized or driven by either analog or digital signals in a well-known manner as the line exposing arrays 56, 58, and 60 scan across the photosensitive material 62 when the photosensitive material 62 is driven by rollers 74 and 76 in the direction of the arrow A. Moreover, the energizing of each plurality of the semiconductor laser diodes 64a-64x, 66a-66x, or 68a-68x may be sequenced in correspondence with the energizing of the stepper motor 78 in a manner well known in the art. A fiber optic faceplate 80, configured in an elongated cubic shape having a substantially planar light receiving surface 82 in spaced parallel relation to a substantially planar light emitting surface 84, is disposed between the line exposer arrays 56, 58, and 60 and the photosensitive material 62. The fiber optic faceplate 80 is well known in the art and comprises a plurality of individual glass fibers which are stacked together, pressed and heated under pressure to form a uniform structure with a plurality of discrete light emitting and light receiving surfaces.

Disposed on the light receiving surface 82 of the fiber optic faceplate 80 are three layers of crystals of this invention collectively shown at 86. Specifically, a first crystal layer is disposed directly on the light receiving surface 82 of the fiber optic faceplate 80 with a second crystal layer disposed over the first crystal layer and with a third crystal layer disposed over the second crystal layer. As shown in FIGS. 3 and 4, the crystal layers 86 are disposed over the entire light receiving surface 82, however, these crystal layers 86 need only be disposed on the areas of the light receiving surface 82 which lie underneath the line exposing arrays 56, 58, and 60, or even, if necessary, just underneath the plurality of the semiconductor laser diodes 64a-64x, 66a-66x, or 68a-68x.

Each crystal layer responds to infrared radiation from one of the three pluralities of semiconductor laser diodes 64a-64x, 66a-66x, or 68a-68x, respectively, and produces therefrom the primary colors, namely, the red, green, and blue, necessary to reconstruct color images onto the photosensitive material 62. If optimized mixtures for all three of the crystal layers 86 is used, each crystal layer will produce in response to the infrared radiation either red, green, and blue emissions. However, if non optimized mixtures for the crystal layers 86 is used, then a dielectric film (not shown) must be placed between the light receiving surface 82 and the first crystal layer and between all adjacent crystal layers so that the dielectric film (not shown) will suppress all emissions except the red, green, and blue emissions. In either case above, the red, green, and blue emissions are transmitted via fiber optic faceplate 80 to a line across the photosensitive material 62 which exposes the line on the photosensitive material 62 to one of the three primary colors necessary to reconstruct the color images onto the photosensitive material 62.

Other embodiments of the invention including additions, subtractions, deletions, and other modifications of the preferred disclosed embodiments of the invention will be obvious to those skilled in the art and are within the scope of the following claims.

What is claimed is:

1. An up converting photoluminescent process for emitting a spectrum of light comprising visible light, ultraviolet light, or combinations thereof, from a crystalline structure comprising a host material doped with a plurality of dopant atoms, each dopant atom further having a ground energy band, a first optically absorbing energy band that has a first energy which is expressed as a first wave number, and a second optically absorbing energy band that has a second energy which is expressed as a second wave number, the second wave number being located in a 11000 to 14000 inverse centimeter range, the first wave number being approximately twice the second wave number, the up converting photoluminescent process comprising the steps of:
   (a) illuminating incident light in the form of a first plurality of photons having substantially the second wave number onto the crystalline structure so that a first portion of the dopant atoms absorbs the first plurality of photons so as to raise the first portion of the dopant atoms from the ground energy band to the second optically absorbing energy band; and
   (b) continuing to illuminate incident light in the form of a second plurality of photons having substantially the second wave number onto the crystalline structure while the first portion of the dopant atoms are at the second optically absorbing energy state so that the first portion of the dopant atoms absorbs a first portion of the second plurality of photons so as to raise the first portion of the dopant atoms to the first optically absorbing energy band and so that a second portion of the dopant atoms absorbs a second portion of the second plurality of photons so as to raise the second portion of the dopant atoms from the round energy band to the second optically absorbing energy band, the plurality of dopant atoms thereafter relaxing so that the first portion of the dopant atoms drops from the first optically absorbing energy band to the ground energy band so as to emit light in the form of photons having a plurality of wave numbers including a select wave number which is the most intense thereof while the second portion of the dopant atoms remain at the second optically absorbing energy band, the select wave number having a value greater than the second wave number but smaller than the first wave number, and thereafter continuing to illuminate incident light in the form of additional pluralities of photons having substantially the second wave number onto the crystalline structure so as to continue the cycle of raising a portion of the dopant atoms from the ground energy band to the first optically absorbing energy band from which the dopant atoms thereafter relax and emit light in the form of photons having a plurality of wave numbers including the select wave number which is the most intense thereof.

2. The process of claim 1 wherein the crystalline structure comprises a composition containing active ions of trivalent rare earth elements and a host material of anhydrous rare earth halides.

3. The process of claim 2 wherein the crystalline structure comprises a composition which is represented by an atomic formula $M_{(1-x)}R_xZ_3$ where M comprises at least one rare earth element selected from the group comprising cerium, gadolinium, yttrium, lanthanum and mixtures thereof, R is a dopant selected from the group comprising neodymium, thulium, erbium, holmium, samarium, and mixtures thereof, x is a value in a range from 0.005 to 1.0, and Z is a halogen selected from the group comprising chlorine, bromine, and iodine.

4. The process of claim 1 wherein the crystalline structure comprises a composition containing active ions of trivalent rare earth elements and a host material of rare earth oxysulfides.

5. The process of claim 4 wherein the crystalline structure comprises a composition which is represented by an atomic formula $M_{2(1-x)}R_{2x}O_2S$ where $O_2S$ is oxysulfide, M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, and x is a value in a range from 0.005 to 1.0.

6. The process of claim 1 wherein the square of the intensity of the incident light illumination onto the crystalline structure determines the intensity of the emitted light from the crystalline structure.

7. The process of claim 1 wherein the steps of illuminating incident light includes the step of forward-biasing a light emitting semiconductor diode to illuminate the optically pumped up converting crystalline structure with a plurality of photons having the second wave number so that the optically pumped up converting crystalline structure will emit light in a 13000 to 26000 inverse centimeter range.

8. The process of claim 1 wherein the second optically absorbing energy band is resonant.

9. An up converting photoluminescent process for emitting a spectrum of light comprising visible light, ultraviolet light, or combinations thereof, from a crystalline structure comprising a host material doped with a plurality of dopant atoms, each dopant atom further having a ground energy band, a first optically absorbing energy band that has a first energy which is expressed as a first wave number, and a second optically absorbing energy band that has a second energy which is expressed as a second wave number, the second wave number being located in a 11000 to 14000 inverse centimeter range, the first wave number being approximately equal to the sum of the second wave number and a third wave number, the up converting photoluminescent process comprising the steps of:

(a) illuminating incident light in the form of a first plurality of photons having substantially the second wave number onto the crystalline structure so that a first portion of the dopant atoms absorbs the first plurality of photons so as to raise the first portion of the dopant atoms from the ground energy band to the second optically absorbing energy band, the first portion of the dopant atoms thereafter relaxing so that the first portion of the dopant atoms drops to a third optically absorbing energy band that has a third energy band which is expressed as the third wave number, the third wave number having a value less than the second wave number; and (b) continuing to illuminate incident light in the form of a second plurality of photons having substantially the second wave number onto the crystalline structure while the first portion of the dopant atoms are at the third optically absorbing energy state so that the first portion of the dopant atoms absorbs a first portion of the second plurality of photons so as to raise the first portion of the dopant atoms to the first optically absorbing energy band and so that a second portion of the dopant atoms absorbs a second portion of the second plurality of photons so as to raise the second portion of the dopant atoms from the ground energy band to the second optically absorbing energy band, the plurality of the dopant atoms thereafter relaxing so that the first portion of the dopant atoms drops from the first optically absorbing energy band to the ground energy band so as to emit light in the form of photons having a plurality of wave numbers including a select wave number which is the most intense thereof while the second portion of dopant atoms drops to the third optically absorbing energy band, the select wave number having a value greater than second wave number but smaller than the first wave number, and thereafter continuing to illuminate incident light in the form of additional pluralities of photons having substantially the second wave number onto the crystalline structure so as to continue the cycle of raising a portion of the dopant atoms from the ground energy band to the first optically absorbing energy band from which the dopant atoms thereafter relax and emit light in the form of photons having a plurality of wave numbers including the select wave number which is the most intense thereof.

10. The process of claim 9 wherein the crystalline structure comprises a composition containing active ions of trivalent rare earth elements and a host material of anhydrous rare earth halides.

11. The process of claim 10 wherein the crystalline structure comprises a composition which is represented by an atomic formula $M_{(1-x)}R_xZ_3$ where M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, x is a value in a range from 0.005 to 1.0, and Z is a halogen selected from the group comprising chlorine, bromine, and iodine.

12. The process of claim 9 wherein the crystalline structure comprises a composition containing active ions of trivalent rare earth elements and a host material of rare earth oxysulfides.

13. The process of claim 12 wherein the crystalline structure comprises a composition which is represented by an atomic formula $M_{2(1-x)}R_{2x}O_2S$ where $O_2S$ is oxysulfide, M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, and x is a value in a range from 0.005 to 1.0.

14. The process of claim 9 wherein the square of the intensity of the incident light illumination onto the crystalline structure determines the intensity of the emitted light emitted from the crystalline structure.

15. The process of claim 9 wherein the steps of illuminating incident light includes the step of forward-biasing a light emitting semiconductor diode to illuminate the optically pumped up converting crystalline structure with a plurality of photons having the second wave number so that the crystalline structure will emit light in a 13000 to 26000 inverse centimeter range.

16. The process of claim 9 wherein the second optically absorbing energy band is resonant.

17. An up converting photoluminescent light source responsive to a light pumping source, the light emitted from the light pumping source constituting the pump energy necessary for the up converting light source to emit light comprising visible light, ultraviolet light, or combinations thereof, that is of a shorter wavelength than that of the light emitted from the light pumping source, the up converting photoluminescent light source comprising a crystalline structure containing active ions of trivalent rare earth elements and a host material of anhydrous rare earth halides.

18. The apparatus of claim 17 wherein the crystalline structure further comprises a composition which is represented by the atomic formula $M_{(1-x)}R_xZ_3$ where M comprises at least one rare earth element selected from the group comprising cerium, gadolinium, yttrium, lanthanum, and mixtures thereof, R is a dopant selected rom the group comprising neodymium, thulium, erbium, holmium, samarium, and mixtures thereof, x is a value in a range from 0.005 to 1.0, and Z is a halogen selected from the group comprising chlorine, bromine, and iodine.

19. The apparatus of claim 17 wherein the light pump source is a light emitting semiconductor diode with means for forward-biasing so that the diode can radiate light in a 11000 to 14000 inverse centimeter range onto the crystalline structure so that the optically pumped up converting light source will emit light in the 13000 to 26000 inverse centimeter range.

20. The apparatus of claim 17 wherein the square of the intensity of the light pump source radiating onto the crystalline structure determines the intensity of the light emitted from the crystalline structure.

21. An up converting photoluminescent light source responsive to a light pumping source, the light emitted from the light pumping source constituting the pump energy necessary for the up converting light source to emit light comprising visible light, ultraviolet light, or combinations thereof, that is of a shorter wavelength than that of the light emitted from the light pumping source, the up converting photoluminescent light source comprising a crystalline structure containing active ions of trivalent rare earth elements and a host material of rare earth oxysulfides.

22. The apparatus of claim 21 wherein the crystalline structure further comprises a composition which is represented by an atomic formula $M_{2(1-x)}R_{2x}O_2S$ where $O_2S$ is oxysulfide, M comprises of at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, and x is a value in a range from 0.005 to 1.0.

23. The apparatus of claim 21 wherein the light pump source is a light emitting semiconductor diode with means for forward-biasing so that the diode can radiate light in a 11000 to 14000 inverse centimeter range onto the crystalline structure so that the optically pumped up converting crystalline structure will emit light in a 13000 to 26000 inverse centimeter range.

24. The apparatus of claim 21 wherein the square of the intensity of the light pump source radiating onto the crystalline structure determines the intensity of the light emitted from the crystalline structure.

25. Apparatus for selectively exposing a plurality of longitudinally spaced areas across the face of a photosensitive medium comprising:
  (a) an elongated coherent fiber optic faceplate substrate having a substantially planar light receiving surface oppositely spaced apart with respect to a substantially planar light emitting surface;
  (b) a plurality of light emitting sources each light emitting source being selectively spaced with respect to an adjacent light emitting source and having a light emitting surface fixedly stationed in effective light transmitting relationship to the light receiving surface of the fiber optic faceplate; and
  (c) a plurality of uniform layers of a photoluminescent crystalline structure disposed on the light receiving surface of the fiber optic faceplate, the photoluminescent crystalline structure comprising active ions of trivalent rare earth elements and a host material of anhydrous rare earth halides, the plurality of crystalline structure layers being disposed on the light receiving surface so as to receive light of a first wavelength from the light emitting sources and to emit therefrom light of a second wavelength which is shorter than the first wavelength, the light emitting surface of the fiber optic faceplate being stationed to accommodate the placement of the photosensitive medium in sufficiently close proximity thereto so that the photosensitive medium receives the light produced from the plurality of crystalline structure layers, the light produced from the plurality of crystalline structure layers comprising visible light, ultraviolet light, or combinations thereof.

26. The apparatus of claim 25 wherein the crystalline structure further comprises a composition which is represented by an atomic formula $M_{(1-x)}R_xZ_3$ where M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, x is a value in a range from 0.005 to 1.0, and Z is a halogen selected from the group comprising chlorine, bromine, and iodine.

27. The apparatus of claim 25 wherein the plurality of the light sources are a plurality of light emitting semiconductor diodes with means for forward-biasing so that the diodes can radiate light in the 11000 to 14000 inverse centimeter range onto the crystalline structure layers so that the optically pumped up converting crystalline structure layers will emit light in a 13000 to 26000 inverse centimeter range.

28. The apparatus of claim 27 wherein the plurality of light emitting semiconductor diodes is at least three light emitting semiconductor diodes and the plurality of uniform layers of a crystalline structure is at least three uniform crystalline structure layers, each semiconductor diode radiating light of a different wave member onto the plurality of crystalline structure layers so that the optically pumped up converting crystalline structure layers will produce either red, green, or blue light depending on which one of the three semiconductor diodes is radiating onto the crystalline structure layers.

29. The apparatus of claim 25 wherein the square of the intensity of the light emitting sources radiating onto the crystalline structure layers determines the intensity of the light emitted from the plurality of crystalline structure layers.

30. Apparatus for selectively exposing a plurality of longitudinally spaced areas across the face of a photosensitive medium comprising:
    (a) an elongated coherent fiber optic faceplate substrate having a substantially planar light receiving surface oppositely spaced apart with respect to a substantially planar light emitting surface;
    (b) a plurality of light emitting sources each light emitting source being selectively spaced with respect to an adjacent light emitting source and having a light emitting surface fixedly stationed in effective light transmitting relationship to the light receiving surface of the fiber optic faceplate; and
    (c) a plurality of uniform layers of a photoluminescent crystalline structure disposed on the light receiving surface of the fiber optic faceplate, the photoluminescent crystalline structure comprising active ions of trivalent rare earth elements and a host material of rare earth oxysulfides, the plurality of crystalline structure layers being disposed on the light receiving surface so as to receive light of a first wavelength from the light emitting sources and to emit therefrom light of a second wavelength which is shorter than the first wavelength, the light emitting surface of the fiber optic faceplate being stationed to accommodate t he placement of the photosensitive medium in sufficiently close proximity thereto so that the photosensitive medium receives the light produced from the plurality of crystalline structure layers, the light produced from the plurality of crystalline structure layers comprising visible light, ultraviolet light, or combinations thereof.

31. The apparatus of claim 30 wherein the crystalline structure further comprises a composition which is represented by an atomic formula $M_{2(1-x)}R_{2x}O_2S$ where $O_2S$ is oxysulfide, M comprises at least one rare earth element selected from the group comprising cerium, gadolinium, yttrium, lanthanum, and mixtures thereof, R is a dopant selected from the group comprising neodymium, thulium, erbium, holmium, samarium, and mixtures thereof, and x is a value in a range from 0.005 to 1.0.

32. The apparatus of claim 30 wherein the plurality of the light sources are a plurality of light emitting semiconductor diodes with means for forward-biasing so that the diodes can radiate light in the 11000 to 14000 inverse centimeter range onto the crystalline structure layers so that the optically pumped up converting crystalline structure layers will emit light in a 13000 to 26000 inverse centimeter range.

33. The apparatus of claim 32 wherein the plurality of light emitting semiconductor diodes is at least three light emitting semiconductor diodes and the plurality of uniform layers of a crystalline structure is at least three uniform crystalline structure layers, each semiconductor diode radiating light of a different wave number onto the plurality of crystalline structure layers so that the optically pumped up converting crystalline structure layers will produce either red, green, or blue light depending on which one of the three diodes is radiating onto the crystalline structure layers.

34. The apparatus of claim 30 wherein the square of the intensity of the light emitting sources radiating onto the crystalline structure layers determines the intensity of the light emitted from the plurality of crystalline structure layers.

* * * * *

UNITED STATES PATENT AND TRADEMARK OFFICE
CERTIFICATE OF CORRECTION

PATENT NO. : 5,166,948  Page 1 of 2
DATED : November 24, 1992
INVENTOR(S) : Pavle Gavrilovic and Shobha Singh It is certified that error appears in the above-identified patent and that said Letters Patent is hereby corrected as shown below:

ON THE TITLE PAGE: Item [56]

under References Cited, U.S. PATENT DOCUMENTS, line 2, add the following references:

| | | | |
|---|---|---|---|
| 3,305,689 | 2/1967 | Leavy et al. | 250/227 |
| 3,522,367 | 7/1970 | Jones et al. | 178/5.4 |
| 4,297,584 | 10/1981 | Buchanan et al. | 250/483 |
| 3,891,560 | 6/1975 | Chester | 250/461 |
| 4,316,092 | 2/1982 | Rabatin | 250/483 |
| 4,529,647 | 7/1985 | Maeoka et al. | 428/323 |
| 4,654,558 | 3/1987 | Obata et al. | 313/372 |
| 3,887,724 | 6/1975 | Diakides | 427/64 |
| 3,875,627 | 4/1975 | Hasegawa et al. | 29/25.13 |
| 3,803,407 | 4/1974 | Anderson | 250/213 VT |
| 4,266,137 | 5/1981 | Shaffer | 250/483 |
| 3,659,136 | 4/1972 | Grodkiewicz et al. | 313/108D |
| 3,851,268 | 11/1974 | Singh et al. | 330/4.3 |
| 3,654,463 | 4/1972 | Geusic et al. | 250/71R |
| 4,705,952 | 11/1987 | Lindmayer | 250/484.1 |
| 4,974,928 | 12/1990 | Caufield et al. | 350/96.27 |
| 4,921,316 | 5/1990 | Fantone et al. | 350/96.27 |
| 4,907,280 | 3/1990 | Barney et al. | 382/1 |
| 3,546,460 | 10/1967 | Lally | 250/483.1 |
| 4,051,374 | 9/1977 | Drexhage et al. | 250/370 |
| 3,210,585 | 10/1965 | McNaney | 313/92 |

UNITED STATES PATENT AND TRADEMARK OFFICE
CERTIFICATE OF CORRECTION

PATENT NO. : 5,166,948

DATED : November 24, 1992

INVENTOR(S) : Pavle Gavrilovic and Shobha Singh

It is certified that error appears in the above-identified patent and that said Letters Patent is hereby corrected as shown below:

| | | | |
|---|---|---|---|
| 3,280,358 | 10/1966 | Thompson | 250/486.1 |
| 3,859,527 | 1/1975 | Luckey | 250/327 |

OTHER PUBLICATIONS

"Blue and green CW upconversion lasing in Er:YLiF$_4$" by Herbert et al., Applied Physics Letter, Vol. 57, No. 17, 22 Oct. 90, pp. 1727 - 29

"Violet CW neodymium upconverting laser" by Macfarlane et al., Applied Physics Letter, Vol. 52, No. 16, 18 Apr. 1988, pp. 1300 - 1302

Signed and Sealed this

Seventh Day of December, 1993

*Attest:*

BRUCE LEHMAN

*Attesting Officer*    *Commissioner of Patents and Trademarks*